United States Patent [19]

Takakuwa et al.

[11] Patent Number: 5,189,440
[45] Date of Patent: Feb. 23, 1993

[54] PRINTER WITH DUAL COLOR DENSITY REGULATION

[75] Inventors: Kiyoshi Takakuwa; Keisuke Oda, both of Hiroshima, Japan

[73] Assignee: Mitsubishi Denki Kabushiki Kaisha, Tokyo, Japan

[21] Appl. No.: 784,258

[22] Filed: Oct. 29, 1991

[30] Foreign Application Priority Data

Nov. 9, 1990 [JP] Japan .................................. 2-302781

[51] Int. Cl.⁵ ............................................. G01D 15/10
[52] U.S. Cl. ................................. 346/76 PH; 358/298
[58] Field of Search ............... 346/76 PH; 358/298; 400/120

[56] References Cited

U.S. PATENT DOCUMENTS

| | | | |
|---|---|---|---|
| 4,340,911 | 7/1982 | Kato et al. ........................... | 358/280 |
| 4,795,281 | 1/1989 | Ulinski, Sr. et al. ........... | 346/76 PH |
| 4,827,279 | 5/1989 | Lubinsky et al. .............. | 346/76 PH |
| 4,939,581 | 7/1990 | Shalit ............................... | 346/110 R |

FOREIGN PATENT DOCUMENTS

| | | |
|---|---|---|
| 61-206674 | 9/1986 | European Pat. Off. . |
| 63-082762 | 4/1988 | European Pat. Off. . |
| 1238958 | 9/1989 | European Pat. Off. . |
| 1285349 | 11/1989 | European Pat. Off. . |
| 2084876 | 3/1990 | European Pat. Off. . |
| 0424920 | 5/1991 | European Pat. Off. . |
| 0274589 | 11/1989 | Japan . |
| 1288465 | 11/1989 | Japan . |

Primary Examiner—Benjamin R. Fuller
Assistant Examiner—Huan Tran
Attorney, Agent, or Firm—Leydig, Voit & Mayer

[57] ABSTRACT

A printer for printing variable density, multiple color prints in response to commands for controlling parameters, such as color density of a printed image, and image data sent from a host computer includes a CPU responsive to commands from the host computer; a first variable density regulating circuit storing color density correction data, receiving image data from the host computer, and connected to and controlled by the CPU for totally regulating the color density of a color image to be printed and outputting totally regulated image data; a second variable density regulating circuit connected to the first variable density regulating circuit and to the CPU and storing a plurality of predetermined density regulating data for finely regulating the color density of the color image to be printed in response to the totally regulated image data received from the first variable density regulating circuit and one of the predetermined density regulating data selected by an operator through the CPU and outputting finely regulated image data; and a printing device connected to the second variable density regulating circuit for receiving the finely regulated image data from the second variable density regulating circuit and printing the color image in response.

2 Claims, 6 Drawing Sheets

PRINTER WITH DUAL COLOR DENSITY REGULATION

BACKGROUND OF THE INVENTION

The present invention relates to a printer and, particularly, to a printer of the sublimation type in which factors, such as factors determining color density, which are necessary to produce a constant print quality regardless of variations of an ink sheet and/or variation of printer used, can be set arbitrarily by sending a command through a host computer.

FIG. 11 shows, in block form, a typical example of a conventional printer together with a host computer connected to the printer.

In FIG. 11, the printer 2 comprises an operation panel 3 for regulating the density of respective colors of a print, a CPU 4 connected to the operation panel 3, a data input circuit 5 connected to the external host computer 1, such as personal computer, for receiving image information therefrom, an image memory 6 connected to the input circuit 5 for storing image information, a fixed density regulator circuit 7 connected to the CPU 4 and the image memory 6 and including, for example, a ROM for controlling the image information read out from the image memory 6 according to color regulation information supplied from the operation panel 3 through the CPU 4, a thermal head drive circuit 8 connected to the fixed density regulator circuit 7, and a thermal head 9 connected to the thermal head drive circuit 8.

Since characteristics of an ink sheet and/or printer to be used to print image data supplied by the host computer 1 vary from printer to printer, it is necessary, in order to obtain a satisfactory print using any available printer and ink sheet, that the colors Y (yellow), M (magenta), C (cyan) and BK (black), of the print be regulated in density according to the printer and ink sheet used.

In the conventional printer 2, such regulation has been performed by an operator through the operation panel 3. That is, one of a plurality of predetermined density regulating data preliminarily stored in the fixed density regulator circuit 7 is selected by the operator through the operation panel 3 and the CPU 4 and data from the host computer 1 are passed through the data input circuit 5 and the image memory 6, regulating in color density according to the selected regulation data in the fixed density regulator circuit 7 and printed through the thermal head drive circuit 8 and the thermal head 9.

The user looks at the resultant print and regulates the densities of the various colors through the operation panel 3 if the print is not satisfactory, and this procedure is repeated until a fully satisfactory print is obtained.

Since, in the conventional printer mentioned above, the regulation of color density is performed repeatedly by trial and error, it is troublesome and inefficient.

SUMMARY OF THE INVENTION

An object of the present invention is to provide a printer capable of automatically and efficiently regulating color density.

According to the present invention, the above object is realized by a printer comprising:

first density regulating means for regulating color density input data externally inputted on a basis of a first operation;

second density regulating means for regulating an output of the first density regulating means on a basis of a second operation; and output means for printing an output of the second regulating means.

In the present invention, the density specified in the input data is regulated by the first density regulating means according to the first operation. The density specified in the output of the first density regulating means is regulated by the second density regulating means according to the second operation and the output of the second density regulating means is printed.

DETAILED DESCRIPTION OF THE PREFERRED EMBODIMENTS

The present invention will be described with reference to FIG. 1 which is a block diagram of an embodiment of the printer according to the present invention.

Figure 1:
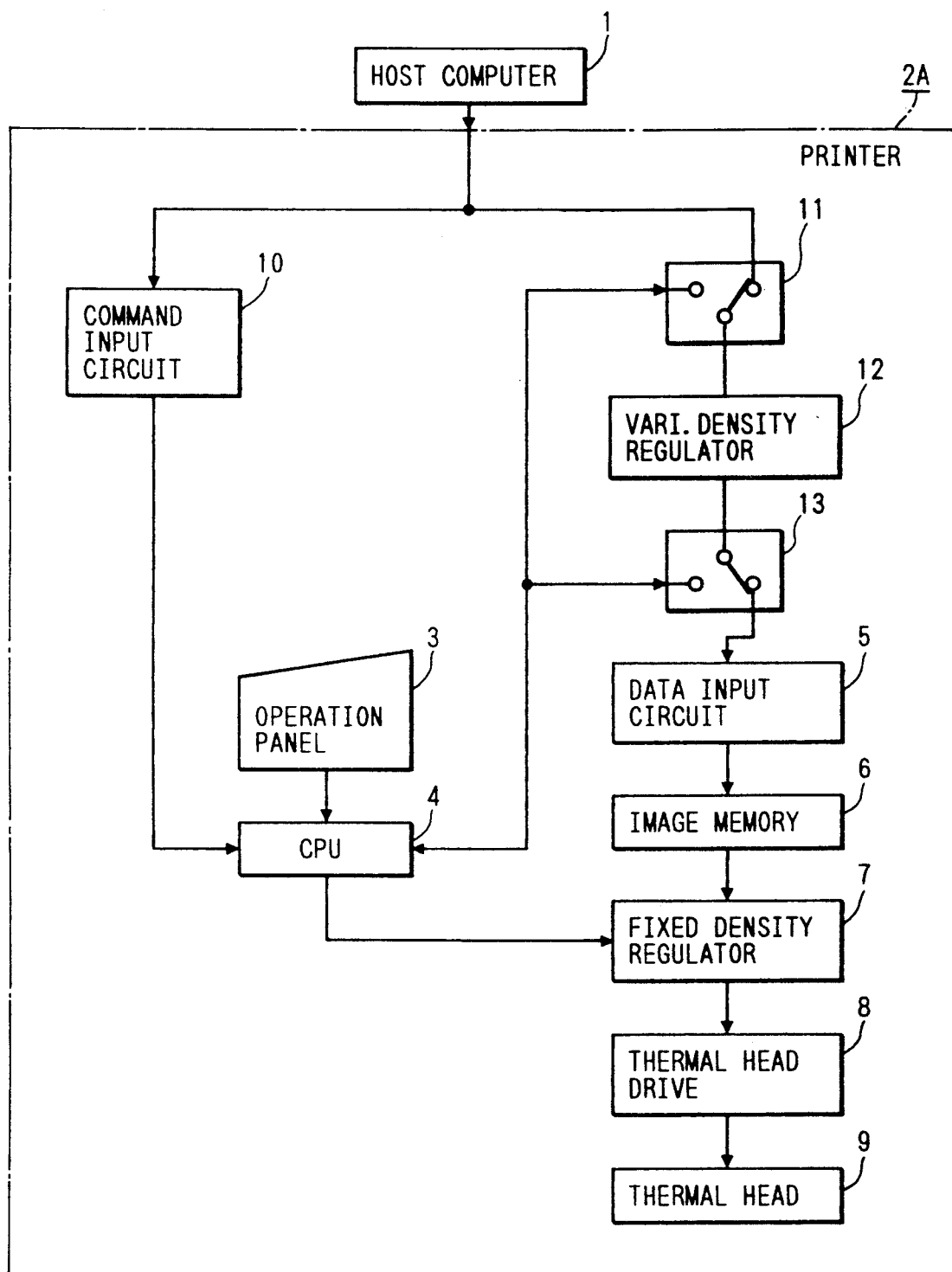
FIG. 1 is a block diagram showing an embodiment of the present invention.
Figure 11:
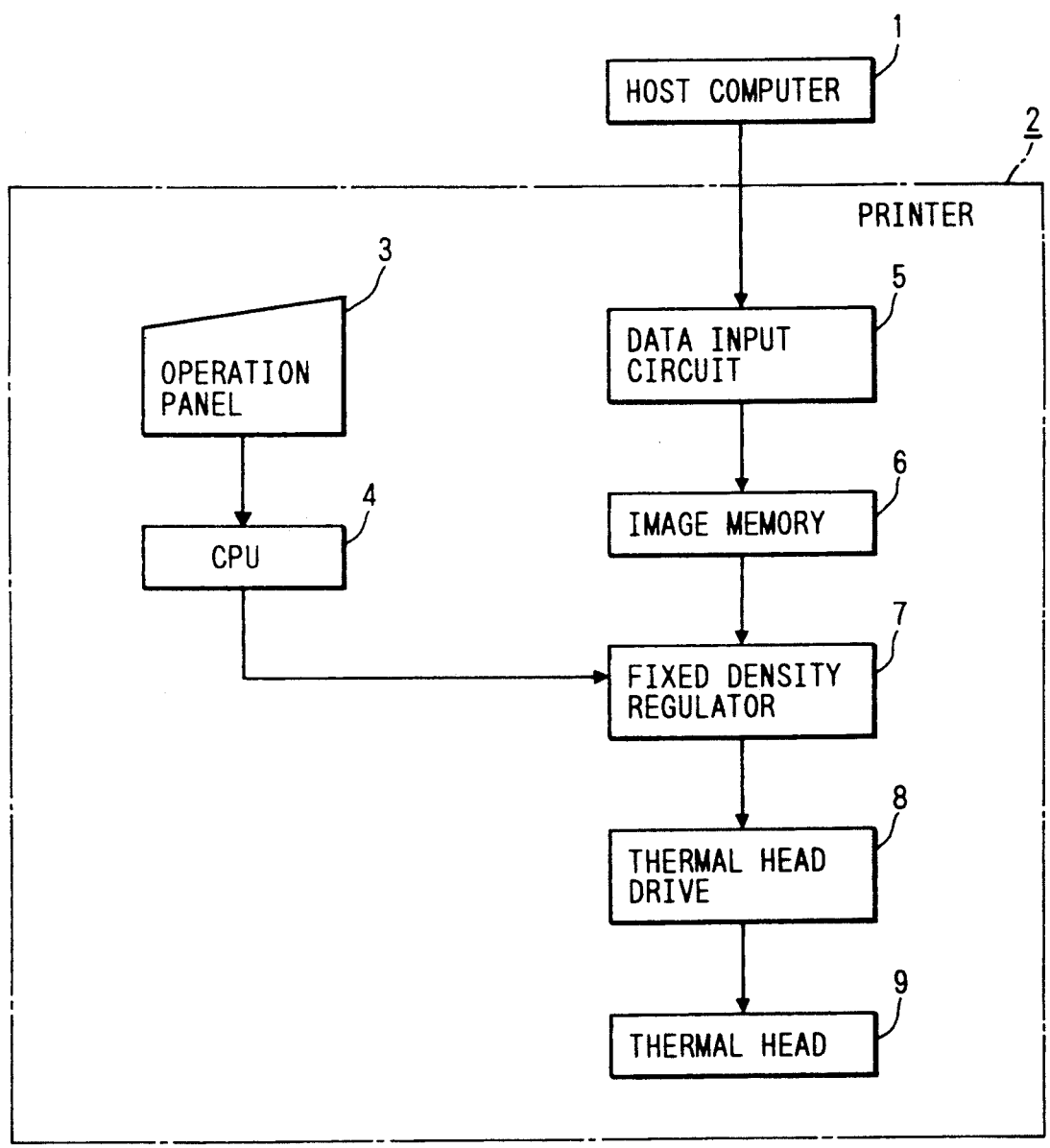
FIG. 11 is a block diagram showing a conventional printer.

In FIG. 1, a printer 2A is connected to a host computer 1. The printer 2A in this embodiment includes, in addition to an operation panel 3, a CPU 4, a data input circuit 5, an image memory 6, a fixed density regulator circuit 7, a thermal head drive circuit 8, and a thermal head 9 connected to the thermal head drive circuit 8 shown in FIG. 11, a command input circuit 10 having an input connected to the host computer 1 and an output connected to the CPU 4, a variable density regulator circuit 12 composed of an EEPROM, etc., a switch 11 for selectively connecting the input of the variable density regulator circuit 12 to the host computer 1 or to the CPU 4, a second switch 13 for selectively connecting the input of the data input circuit 5 to the output of the variable density regulator circuit 12 or to the CPU 4.

The command input circuit 10, the CPU 4, the switch circuits 11 and 13 and the variable density regulator circuit 12 are included in a first density regulator means and the command input circuit 10, the operation panel 3, the CPU 4 and the fixed density regulator circuit 7 are part of second density regulator means. The thermal head drive circuit 8 and the thermal head 9 constitute output means.

Figure 2:
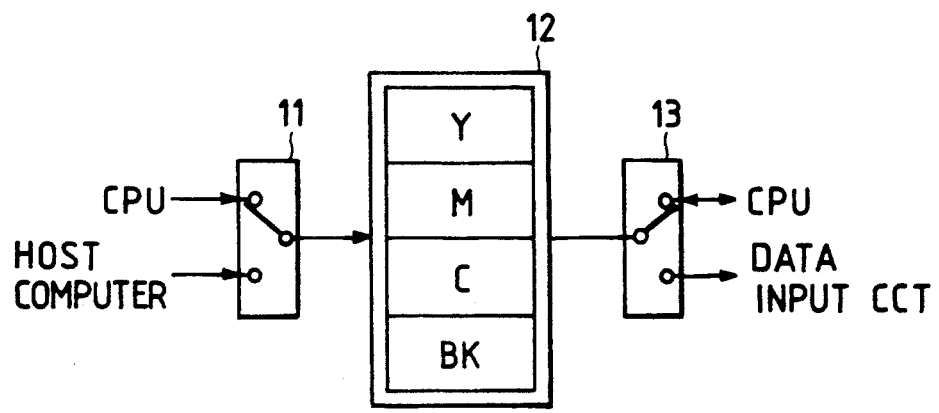
FIG. 2 is a block circuit diagram of a variable density regulator circuit according to an embodiment of the present invention.
Figure 3:
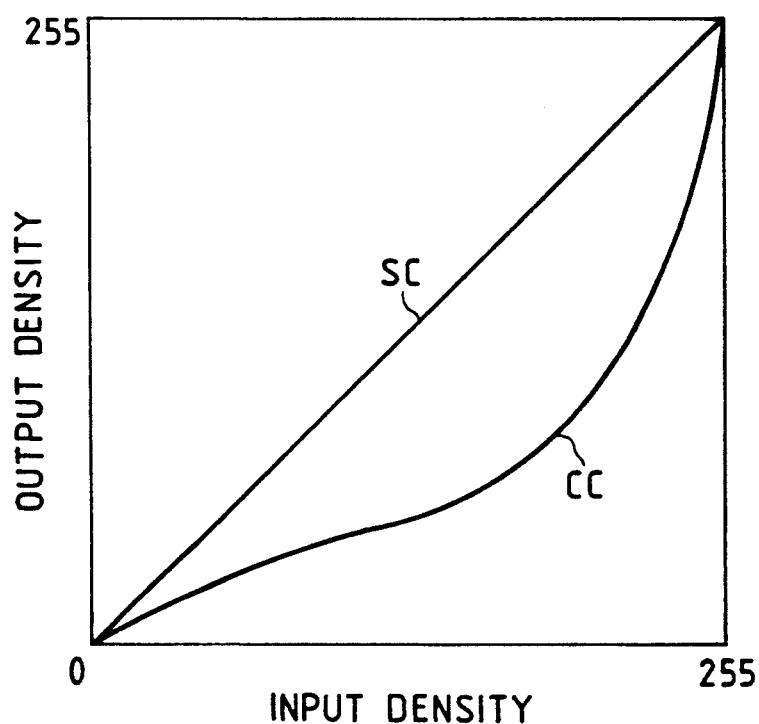
FIG. 3 is a graph showing a density characteristics of the variable density regulator circuit.

FIG. 2 is a block diagram showing the switch circuits 11 and 13 and the variable density regulator circuit 12 in more detail and FIG. 3 shows density characteristics of the variable density regulator circuit 12, in which input density and output density are plotted along the abscissa and the ordinate, respectively, scaled from 0 to 255 to cover 256 levels, each level being represented by 8 bits. The larger the density value, the higher the density. The curve marked SC is a standard curve and the curve marked CC is a correction curve.

In a usual printing operation, the switches 11 and 13 are in the positions shown in FIG. 1 and image data from the host computer 1 is loaded in the variable density regulator circuit 12, corrected according to the standard curve SC and supplied through the switch 13 to the data input circuit 5. The subsequent operation is the same as that of the conventional printer.

An operator looks at a resultant print to decide if the printer color density is satisfactory. If not, the data loaded in the variable density regulator circuit 12 needs to be changed. To change this data, the operator provides, through the host computer 1, a command C1 changing the data in the variable density regulator circuit 12 and the correction data for colors Y, M, C, and BK supplied to the command input circuit 10 of the printer 2A.

The CPU 4 responds to the command C1 sent through the command input circuit 10 by actuating the switch circuits 11 and 13 to the state shown in FIG. 2 so that the correction data is supplied to the variable density regulator circuit 12.

For example, when ($\gamma$)conversion data is sent to the variable density regulator circuit 12 as the correction data, the density characteristics of the variable density regulator circuit 12 become those shown by the correction curve CC in FIG. 3. Therefore, it becomes possible to arbitrarily regulate density through the host computer 1. Thus, the first density regulation is performed.

Then, the second density regulation is performed. This will be described with reference to FIGS. 4 to 6.

The relation between input density and output density is generally represented by the following equation:

Y represents $= A$ is $X^\gamma + B$ is where X represents input density, Y output density, A a parameter indicating contrast, B a parameter indicating density and ($\gamma$) a parameter indicating gamma.

Figure 4:
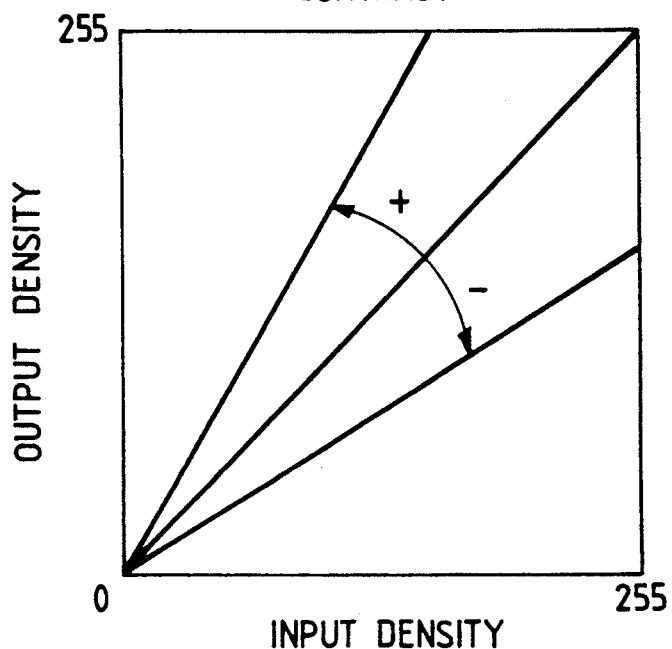
FIGS. 4 to 6 show characteristics of a fixed density regulator circuit according to an embodiment of the present invention.
Figure 5:
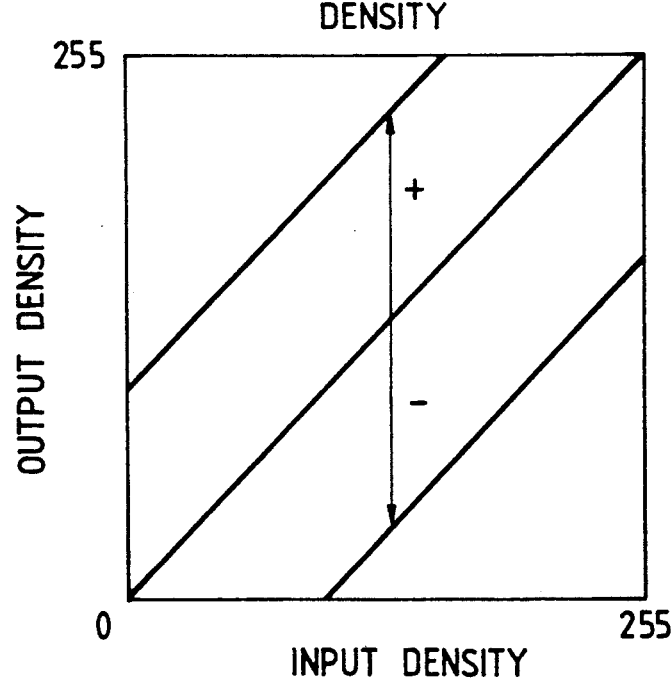
Figure 6:
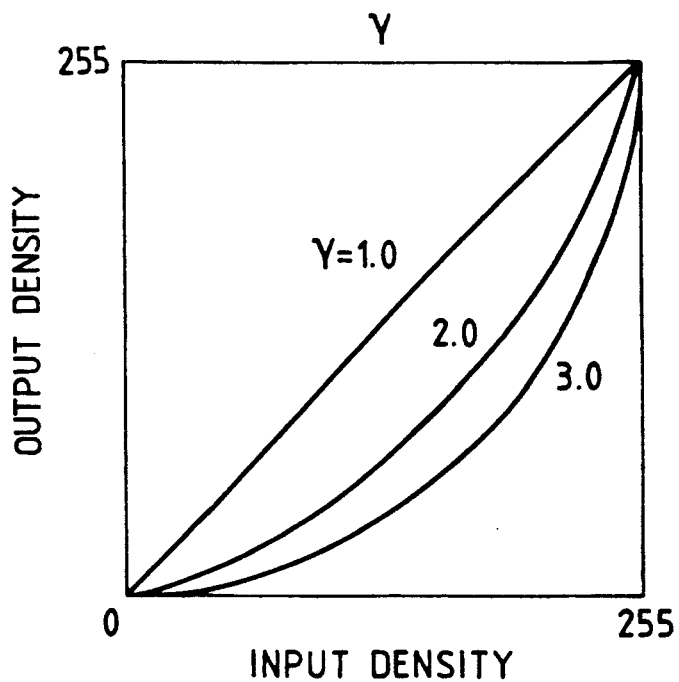

FIGS. 4 to 6 show density characteristics of the fixed density regulator circuit 7 with the abscissa and the ordinate showing output density in 256 (0 to 255) levels, for contrast parameter A, density parameter B and gamma parameter, respectively.

Therefore, by changing the values of the respective parameters, it is possible to select any of various density characteristics.

When a command C2 instructing a change in parameter A is sent by the operator from the host computer 1 to the command input circuit 10, the CPU 4 causes the fixed density regulator circuit 7 which has been loaded with a data including different values of respective parameters A, B and $\gamma$ to select density characteristics of different contrast such as shown in FIG. 4. For example, when the parameter A has a large value, the contrast becomes high and vice versa.

Similarly, when the host computer 1 sends a command C3 instructing changing parameter B to the command input circuit 10, the CPU 4 causes the fixed density regulator circuit 7 to select density characteristics of a different density such as shown in FIG. 5. The larger the value of the parameter B, the greater the density and vice versa.

When the host computer 1 sends a command C4 instructing changing $\gamma$ to the command input circuit 10, the CPU 4 causes the fixed density regulator circuit 7 to select density characteristics with a different gamma value. For example, with parameter $\gamma = 1.0$, 2.0 or 3.0, the characteristics shown in FIG. 6 are selected by the fixed density regulator circuit 7.

Therefore, the user can regulate the density of printing by sending any command through the host computer 1.

Figure 7:
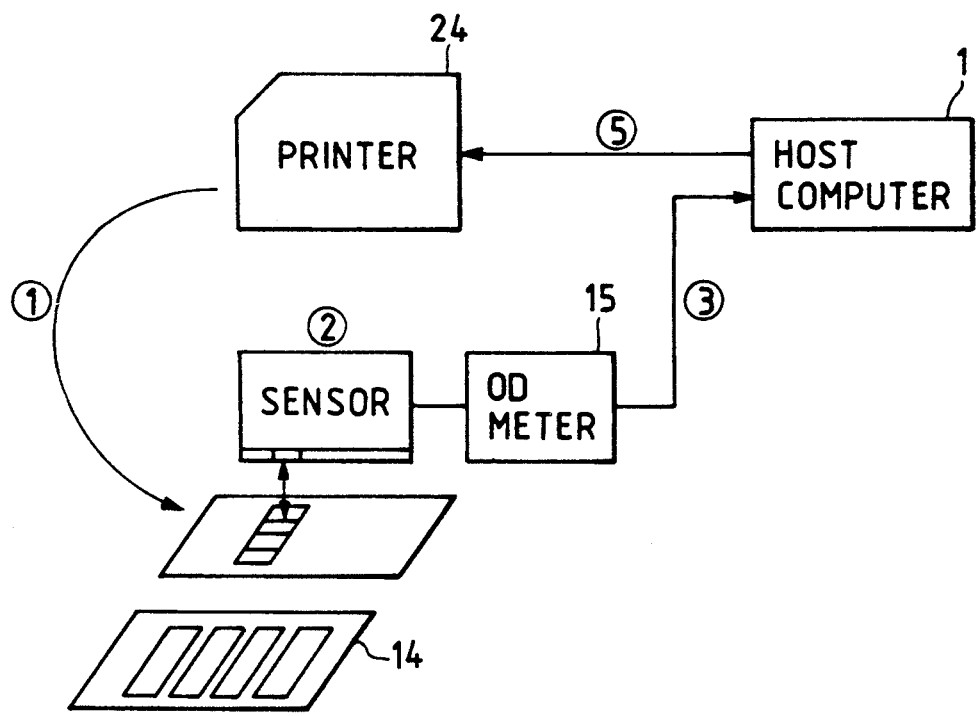
FIG. 7 illustrates a procedure for regulating density according to the present invention.
Figure 8:
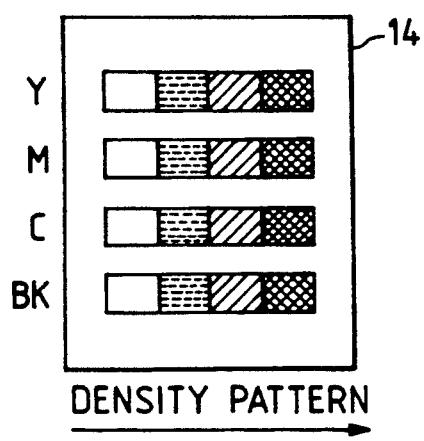
FIG. 8 shows a standard optical density palette used in regulating density.
Figure 9:
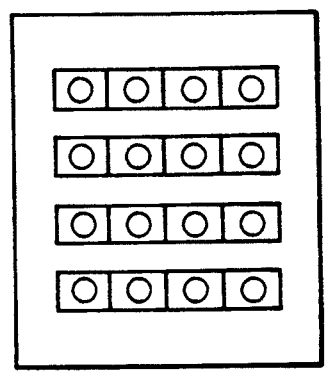
FIG. 9 shows density measuring points on a print sheet.
Figure 10:
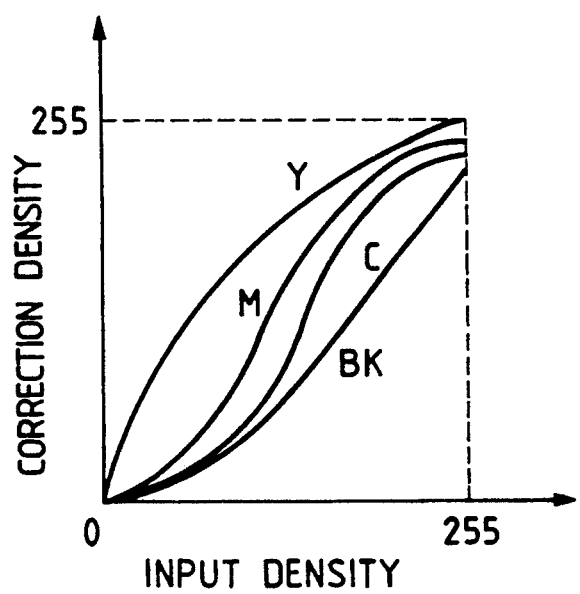
FIG. 10 shows characteristics of density correcting data loaded into the variable density regulator circuit.

Now, the procedure of the first density regulation described with reference to FIGS. 2 and 3 will be described in more detail with reference to FIGS. 7 to 10, in which FIG. 7 illustrates the procedure for the first density regulation which includes steps 1 to 5, FIG. 8 shows a standard optical density (OD) palette 14 showing patterns of colors Y, M, C and BK each printed with different densities, FIG. 9 shows a pattern of measuring points on a print sheet for measuring density and FIG. 10 shows characteristics indicating correction density data to be loaded in the variable density regulator circuit 12.

It should be noted that the host computer 1 has stored density data read out through an OD meter 15 which may be replaced by a scanner at the respective measuring points on the standard OD palette 14.

In the first step 1 in FIG. 7, the printer 2A prints a test pattern on the basis of the density data on a standard OD palette 14.

In the second step 2, the density of the printed test pattern is read out at the measuring points shown in FIG. 9 by the OD meter 15.

In the third step 3, the density data of the respective measuring points on the test pattern thus read out are sent to the host computer 1.

In the fourth step 4, the host computer 1 compares the density data of the standard OD palette 14 with the density data of the test pattern from which it calculates correction $\gamma$ curves for the respective colors as shown in FIG. 10 by, for example, increasing or decreasing the density data of the standard OD palette 14 so that the comparison indicates an equality. Further, the host computer 1 indicates subsequent steps to be employed on a display such as CRT.

In the step 5, the user looks at the comparison result displayed on the display device, inputs the command C1 through the host computer 1 to instruct the printer 2A to load the correction data into the variable density regulator circuit 12. The host computer 1 sends to the variable density regulator circuit 12 data of the correction $\gamma$ curves for the respective colors to update the content of the variable density regulator circuit 12.

The second density regulation may be used where a user wishes to change color or colors arbitrarily. In such case, the user looks at the print and sends through the host computer 1 the command C2, C3 or C4 or any combination of them to the printer 2A to perform a further density regulation of at least one color by means of the fixed density regulator circuit 7.

As described, since the present invention comprises the variable density regulator circuit 12 which can totally regulate the density of a print and the fixed density regulator circuit 7 which can finely regulate a portion of the print, the $\gamma$ curves, and density determining factors of respective colors through the commands from the host computer 1, density regulation can be carried out automatically and efficiently.

Although in the described embodiment the fixed density regulator circuit 7 is controlled by commands from the host computer 1, it is possible to perform the control through the operation panel 3 of the printer 2A with the same effect.

What is claimed is:

1. A printer for printing variable density, multiple color prints in response to commands for controlling parameters, such as color density of a printed image, and image data sent from a host computer, the printer comprising:
   a CPU responsive to commands from the host computer;
   a first variable density regulating circuit storing color density correction data, receiving image data from the host computer, and connected to and controlled by the CPU for totally regulating the color density of a color image to be printed and outputting totally regulated image data;
   a second variable density regulating circuit connected to the first variable density regulating circuit and to the CPU storing a plurality of predetermined density regulating data for finely regulating the color density of the color image to be printed in response to the totally regulated image data received from the first variable density regulating circuit and one of the predetermined density regulating data selected through the CPU and outputting finely regulated image data; and
   printing means connected to the second variable density regulating circuit for receiving the finely regulated image data from the second variable density regulating circuit and printing the color image in response.

2. The printer of claim 1 including switching means responsive to the CPU and host computer for disconnecting the first variable density regulating circuit from the host computer and the second variable density regulating circuit, changing the image correction data stored in the first variable density regulating circuit during disconnection of the first variable density regulating current from the host computer and the second variable density regulating circuit, and for reconnecting the first variable density regulating circuit to the second variable density regulating circuit and the host computer after changing the stored image correction data.

* * * * *